United States Patent
Sato et al.

(10) Patent No.: US 9,746,024 B2
(45) Date of Patent: Aug. 29, 2017

(54) TILTING PAD TYPE JOURNAL BEARING

(71) Applicant: MITSUBISHI HITACHI POWER SYSTEMS, LTD., Yokohama (JP)

(72) Inventors: Motoki Sato, Tokyo (JP); Kenta Suzuki, Tokyo (JP); Makoto Hemmi, Tokyo (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 0 days.

(21) Appl. No.: 14/961,981

(22) Filed: Dec. 8, 2015

(65) Prior Publication Data

US 2016/0169274 A1 Jun. 16, 2016

(30) Foreign Application Priority Data

Dec. 10, 2014 (JP) ................................. 2014-249781

(51) Int. Cl.
| | |
|---|---|
| F16C 32/06 | (2006.01) |
| F16C 17/03 | (2006.01) |
| F16C 33/10 | (2006.01) |

(52) U.S. Cl.
CPC ............ F16C 17/03 (2013.01); F16C 33/106 (2013.01); F16C 33/108 (2013.01); F16C 33/1045 (2013.01); F16C 33/1085 (2013.01); F16C 2300/34 (2013.01)

(58) Field of Classification Search
CPC ...... F16C 17/03; F16C 17/06; F16C 33/1045; F16C 33/106; F16C 33/108; F16C 33/1085

See application file for complete search history.

(56) References Cited

U.S. PATENT DOCUMENTS

| | | | | |
|---|---|---|---|---|
| 7,237,957 | B2 * | 7/2007 | Geiger | .................. F16C 17/03 384/309 |
| 9,169,866 | B2 * | 10/2015 | Sato | ...................... F16C 37/002 |
| 2014/0205224 | A1 * | 7/2014 | Hemmi | ................... F16C 17/03 384/311 |
| 2015/0003762 | A1 | 1/2015 | Sato et al. | |

FOREIGN PATENT DOCUMENTS

| | | |
|---|---|---|
| EP | 2 762 735 A1 | 8/2014 |
| JP | 2004-197890 A | 7/2004 |
| JP | 2011-179609 A | 9/2011 |
| JP | 2015-007463 A | 1/2015 |

OTHER PUBLICATIONS

Extended European Search Report received in corresponding European Application No. 15199290.6 dated Feb. 8, 2016.

* cited by examiner

*Primary Examiner* — James Pilkington
(74) *Attorney, Agent, or Firm* — Mattingly & Malur, PC

(57) ABSTRACT

Provided is a tilting pad type journal bearing capable of reducing the amount of oil that has to be supplied to the bearing. A bearing comprises nozzles 5 which are each arranged between pads 2 to supply lubricating oil to sliding surfaces 14 of the pads 2. The sliding surface 14 of each of the pad 2 is formed so that the width of the sliding surface 14 increases as it goes from a front edge part towards a rear edge part thereof. A tip end part of each of the nozzles 5 has a groove part 18 which induces a flow heading from lateral parts towards the center in the width direction, in an oil flow from the rear edge part of the sliding surface 14 of an upstream pad 2 to the front edge part of the sliding surface 14 of a downstream pad 2.

6 Claims, 11 Drawing Sheets

CIRCUMFERENTIAL-DIRECTION POSITION $\theta$
ON PAD SLIDING SURFACE

RELATED ART

RELATED ART

RELATED ART

RELATED ART

TILTING PAD TYPE JOURNAL BEARING

BACKGROUND OF THE INVENTION

1. Field of the Invention

The present invention relates to a tilting pad type journal bearing.

2. Description of the Related Art

The slide bearing is a shaft bearing that supports a rotary shaft via a thin fluid film. The slide bearings have higher load bearing performance compared to rolling bearings and also excel in vibration damping properties and shock resistance. Therefore, the slide bearings are widely employed for industrial rotary machines (steam turbines, generators, gas turbines, compressors, etc.) required to have high reliability. Tilting pad type journal bearings, excelling in oscillation stability, are well known as a type of slide bearings used for these rotary machines.

The tilting pad type journal bearing comprises a plurality of pads which are arranged along the periphery of a rotary shaft and a bearing housing which supports the pads in a tiltable manner via a plurality of pivots. Lubricating oil is supplied to the gaps between the peripheral surface of the rotary shaft and sliding surfaces of the pads to form oil films, and the rotary shaft is supported by the pressure of the oil films. Since the tilting angle of each pad changes according to the pressure distribution of the oil film, unstable oscillation such as the so-called "oil whip" can be suppressed.

The tilting pad type journal bearings can be roughly classified into two types: the oil bath type and the direct oil supply type. In the oil bath type, the lubricating oil is supplied to the gaps between the peripheral surface of the rotary shaft and the sliding surfaces of the pads by increasing the sealability of the bearing chamber accommodating the pads and storing the lubricating oil in the bearing chamber. In contrast, in the direct oil supply type, the lubricating oil is supplied to the gaps between the peripheral surface of the rotary shaft and the sliding surfaces of the pads via nozzles arranged between the pads, for example (see JP-2004-197890-A, for example).

SUMMARY OF THE INVENTION

In the tilting pad type journal bearing described in JP-2004-197890-A, the sliding surface of each pad is formed so that its width in the axial direction is constant from the front edge (upstream end in the circumferential direction) to the rear edge (downstream end in the circumferential direction). Therefore, even though part of the lubricating oil supplied from the nozzle to a front edge part of the sliding surface of the pad flows towards a rear edge part of the sliding surface, the rest of the lubricating oil flows towards the side edges of the sliding surface and leaks out. Specifically, since each pad tilts as mentioned above, the thickness of the oil film formed between the peripheral surface of the rotary shaft and the sliding surface of the pad (i.e., the distance between the peripheral surface of the rotary shaft and the sliding surface of the pad) decreases as it goes downstream in the circumferential direction. Therefore, if the width of the sliding surface of the pad in the axial direction is constant as mentioned above, the cross-sectional area of the oil film formed between the peripheral surface of the rotary shaft and the sliding surface of the pad (i.e., the cross-sectional area of the gap formed between the peripheral surface of the rotary shaft and the sliding surface of the pad) also decreases as it goes downstream in the circumferential direction. The oil leaks out via the side edges of the sliding surface of the pad in an amount corresponding to the decrease in the cross-sectional area of the oil film. Thus, the amount of oil leakage via the side edges of the sliding surface of the pad is not small, and the amount of oil supplied from the nozzle has to be set greater in consideration of the amount of oil leakage.

Further, in general, part of the lubricating oil after passing through the rear edge part of the sliding surface of the pad merges with the lubricating oil supplied from the nozzle and flows into the front edge part of the sliding surface of the next pad on the downstream side (carry-over). Therefore, the amount of oil that has to be supplied from the nozzle can be reduced if the amount of the carry-over oil is increased under a condition that the temperature rise of the sliding surface of the pad is relatively slight.

The object of the present invention is to provide a tilting pad type journal bearing capable of reducing the amount of oil that has to be supplied to the bearing.

To achieve the above object, a tilting pad type journal bearing according to the present invention comprises: a plurality of pads which are arranged along the periphery of a rotary shaft; a bearing housing which supports the pads in a tiltable manner via a plurality of pivots, and a plurality of nozzles which are each arranged between the pads to supply lubricating oil to sliding surfaces of the pads. The sliding surface of each of the pads is formed so that the width of the sliding surface increases as it goes from a front edge part towards a rear edge part of the sliding surface. A tip end part of at least one of the nozzles has a groove part which induces a flow heading from lateral parts towards the center in the width direction, in an oil flow from the rear edge part of the sliding surface of an upstream pad to the front edge part of the sliding surface of a downstream pad.

As above, in the tilting pad type journal bearing according to the present invention, the sliding surface of each pad is formed so that its width increases as it goes from the front edge part towards the rear edge part (i.e., so that the width of the front edge part is small and the width of the rear edge part is large). With this configuration, the cross-sectional area of the oil film formed between the peripheral surface of the rotary shaft and the sliding surface of the pad does not decrease as it goes downstream in the circumferential direction, or the decrease can be suppressed. Accordingly, the amount of oil leakage via the side edges of the sliding surface of the pad can be decreased. Consequently, the amount of oil that has to be supplied from the nozzle can be reduced.

Further, the groove part formed in the tip end part of the nozzle induces the flow heading from the lateral parts towards the center in the width direction in the oil flow from the rear edge part of the sliding surface of the pad on the upstream side to the front edge part of the sliding surface of the pad on the downstream side. Accordingly, the ratio of the amount of the lubricating oil flowing into the front edge part of the sliding surface of the downstream pad while merging with the lubricating oil supplied from the nozzle to the amount of the lubricating oil flowing out from the rear edge part of the sliding surface of the upstream pad can be increased. In other words, the amount of the carry-over oil can be increased. Therefore, the amount of oil that has to be supplied from the nozzle can be reduced.

According to the present invention, the amount of oil that has to be supplied to the bearing can be reduced.

DESCRIPTION OF THE PREFERRED EMBODIMENTS

A first embodiment of the present invention will be described below with reference to figures.

Figure 1:
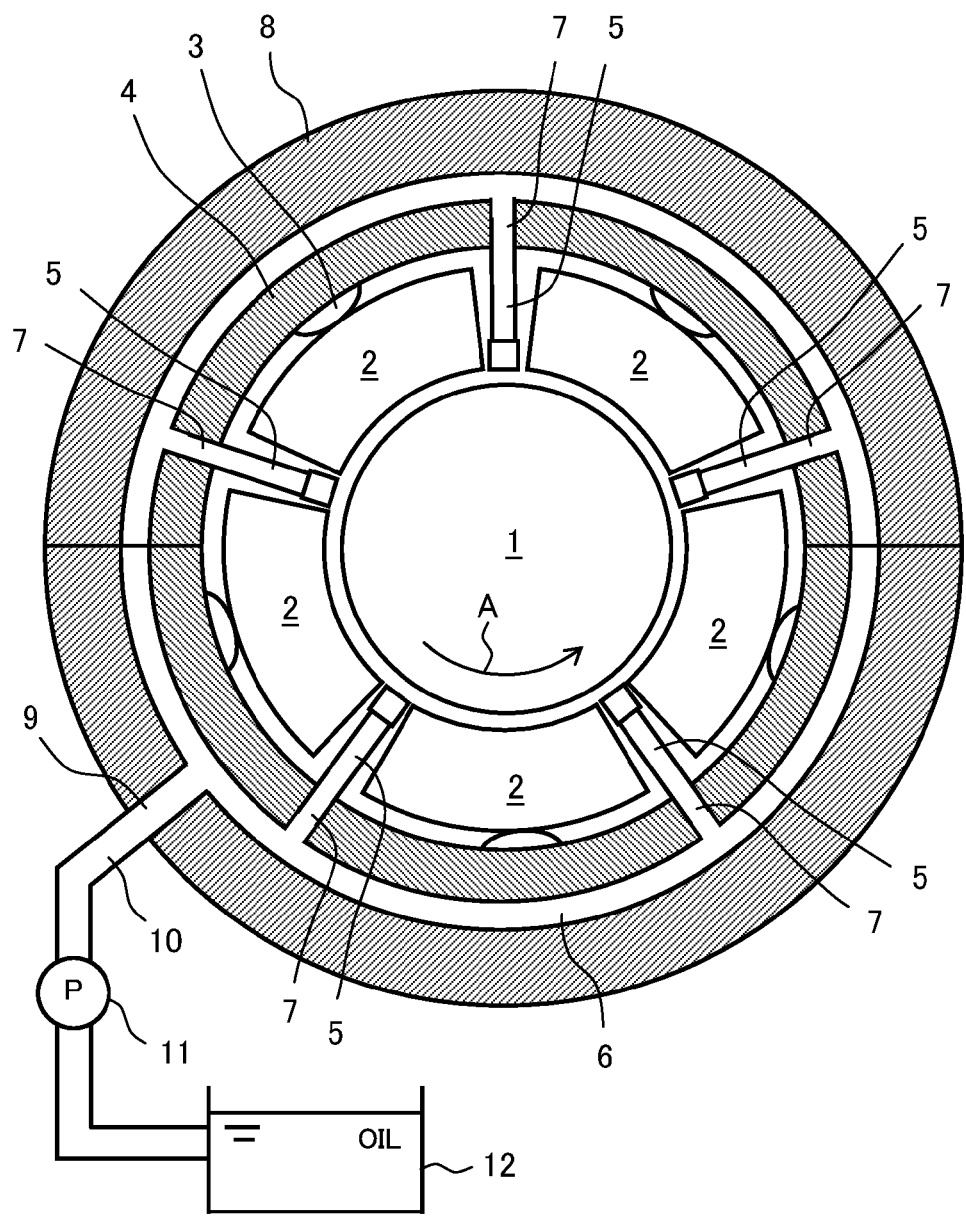
FIG. 1 is a circumferential cross-sectional view showing the structure of a tilting pad type journal bearing according to a first embodiment of the present invention.
Figure 2A:
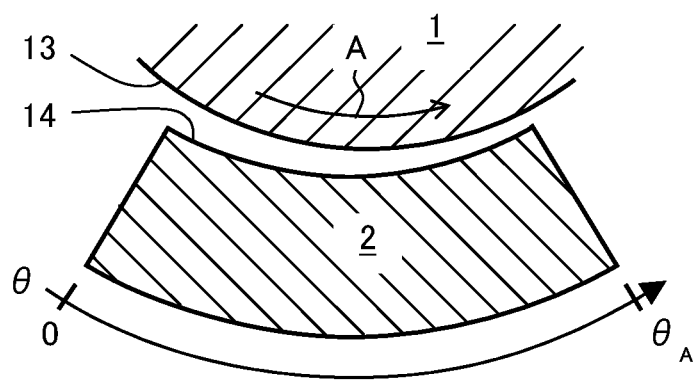
FIG. 2A is a circumferential cross-sectional view showing a tilting state of a pad in the first embodiment of the present invention.
Figure 2B:
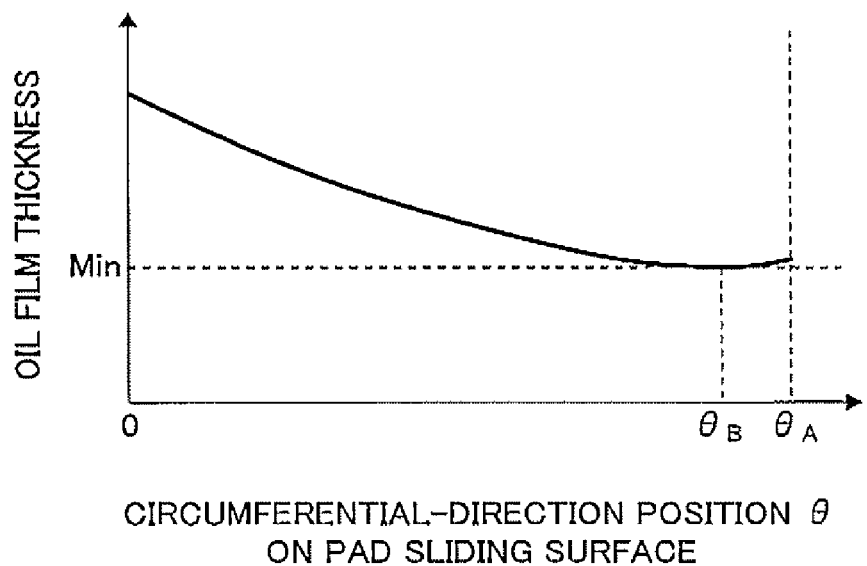
FIG. 2B is a graph showing variations in the thickness of an oil film formed between the peripheral surface of the rotary shaft and a sliding surface of the pad in the first embodiment of the present invention.
Figure 3:
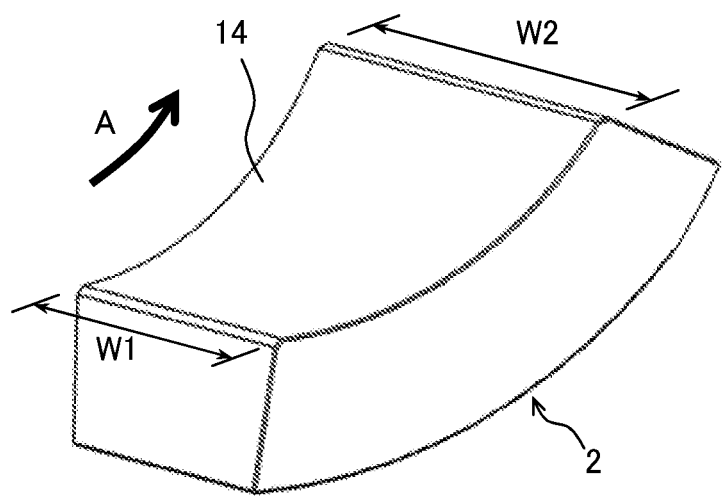
FIG. 3 is a perspective view showing the structure of the pad in the first embodiment of the present invention.
Figure 4:
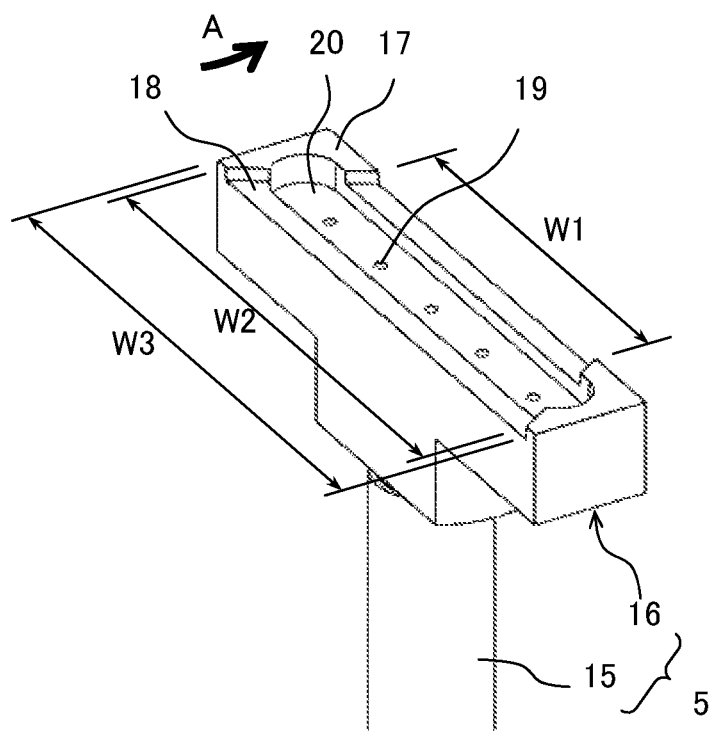
FIG. 4 is a perspective view showing the structure of a nozzle in the first embodiment of the present invention.

FIG. 1 is a circumferential cross-sectional view showing the structure of a tilting pad type journal bearing according to a first embodiment of the present invention. FIG. 2A is a circumferential cross-sectional view showing a tilting state of a pad in this embodiment. FIG. 2B is a graph showing variations in the thickness of an oil film formed between the peripheral surface of the rotary shaft and a sliding surface of the pad in this embodiment. FIG. 3 is a perspective view showing the structure of the pad in this embodiment. FIG. 4 is a perspective view showing the structure of a nozzle in this embodiment.

The tilting pad type journal bearing in this embodiment is a shaft bearing for supporting the radial-direction load of a rotary shaft 1 extending in the vertical direction, for example. The bearing comprises a plurality of (five in FIG. 1) pads 2 which are arranged along the periphery of the rotary shaft 1, a bearing housing 4 which supports the pads 2 in a tiltable (pivotable) manner via a plurality of (five in FIG. 1) pivots 3, and a plurality of (five in FIG. 1) nozzles 5 which are each arranged between the pads 2.

On the peripheral side of the bearing housing 4, an oil guide groove 6 is formed to extend circumferentially. The oil guide groove 6 of the bearing housing 4 is provided with a plurality of oil guide holes 7 penetrating the bearing housing 4 in the radial direction. The oil guide holes 7 are each connected to the nozzles 5. The oil guide groove 6 of the bearing housing 4 is connected to an oil tank 12 via an oil guide hole 9 of a casing 8, a pipe 10, and a pump 11.

By the driving the pump 11, lubricating oil stored in the oil tank 12 is supplied to the oil guide groove 6 of the bearing housing 4, and further to the gap between the peripheral surface 13 of the rotary shaft 1 and the sliding surface 14 of each pad 2 via the oil guide hole 7 of the bearing housing 4 and the nozzles 5. The sliding surface 14 of the pad 2 is formed of metal having a low melting point (e.g., white metal) or resin.

The lubricating oil supplied to the gap between the peripheral surface 13 of the rotary shaft 1 and the sliding surface 14 of each pad 2 rotates following the rotary shaft 1 and forms an oil film (unshown). The rotary shaft 1 is supported by the pressure of the oil film. In this case, each pad 2 tilts as shown in FIG. 2A depending on the pressure distribution in the oil film. Specifically, as shown in FIG. 2B, the thickness of the oil film formed between the peripheral surface 13 of the rotary shaft 1 and the sliding surface 14 of each pad 2 decreases as it goes downstream in the circumferential direction (i.e., rotational direction of the rotary shaft 1 indicated by the arrow A in FIGS. 1 and 2A). More specifically, the oil film thickness takes on the maximum value at the front edge (circumferential-direction position $\theta=0$) of the sliding surface 14 of the pad 2, decreases as it goes downstream in the circumferential direction, and hits the minimum at a circumferential-direction position $\theta_B$. Thereafter, the oil film thickness slightly increases as it goes towards the rear edge (circumferential-direction position $\theta=\theta_A$) of the sliding surface 14.

As shown in FIG. 3, the sliding surface 14 of the pad 2 has a width dimension W1 at the front edge and a greater width dimension W2 at the rear edge (W2>W1). The sliding surface 14 is formed so that its width increases as it goes downstream in the circumferential direction from the front edge to the rear edge. While FIG. 11 (explained later) shows an example in which the sliding surface 14 is formed so that its width increases linearly, the width may also be increased differently (e.g. according to a curve).

As shown in FIG. 4, the nozzle 5 is formed of a round pipe 15 which is connected to the oil guide hole 7 of the bearing housing 4 and a hollow nozzle head 16 (tip end part) which is connected to the tip end of the round pipe 15. The nozzle head 16 has a width dimension W3 greater than the aforementioned width dimension W2 of the rear edge of the sliding surface 14 of the pad 2. Thus, a top surface (tip end surface) 17 of the nozzle head 16 has the width dimension W3.

A groove part 18 is formed on the top surface 17 of the nozzle head 16. The groove part 18 has a substantially trapezoidal shape when viewed in the direction of the normal to the top surface 17. In this embodiment, the width dimension of the front edge of the groove part 18 is W2, which equals the width dimension W2 of the rear edge of the sliding surface 14 of the pad 2, and the width dimension of the rear edge of the groove part 18 is W1, which equals the width dimension W1 of the front edge of the sliding surface 14 of the pad 2. At the bottom of the groove part 18, a plurality of oil discharge ports 19 connecting to the inside of the nozzle head 16 and the round pipe 15 are formed. The oil discharged from these oil discharge ports 19 is supplied to the sliding surface 14 of the pad 2 arranged on the downstream side.

Figure 11:
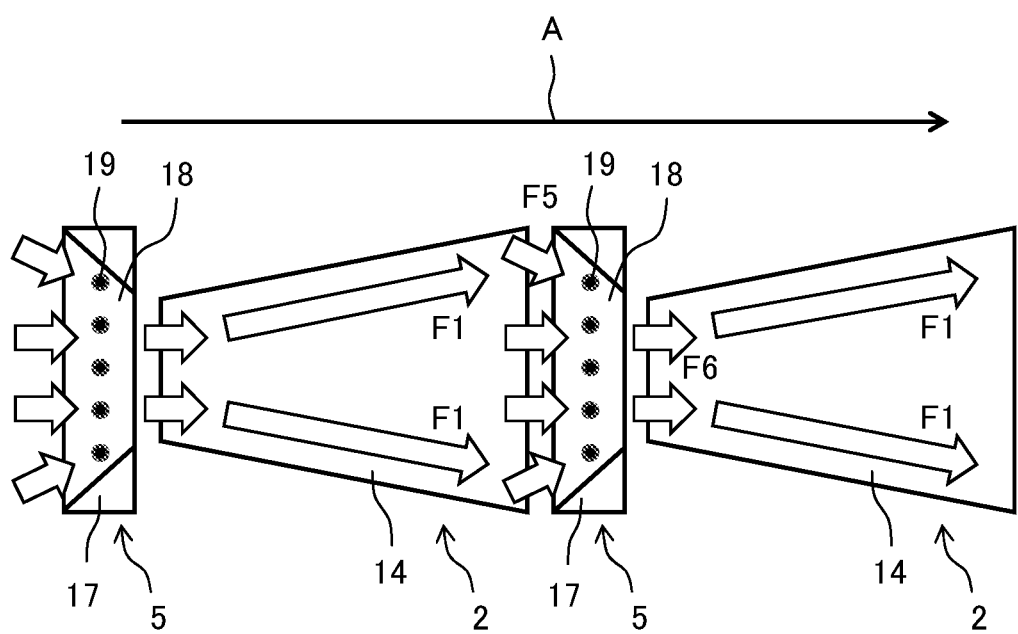
FIG. 11 is a developed view showing the oil flow on the pad sliding surfaces and the nozzle top surfaces in the first embodiment of the present invention.

A concavity 20 as an oil pool is formed around the oil discharge ports 19 (i.e., formed in a part of the groove part 18). With the concavity 20 formed as an oil pool, the oil can be supplied to the sliding surface 14 of the pad 2 even when the pump 11 stopped temporarily for some reason. However, the concavity 20 may also be left out as shown in FIG. 11 (explained later).

Next, the effects of this embodiment will be explained below by using comparative examples.

Figure 5:
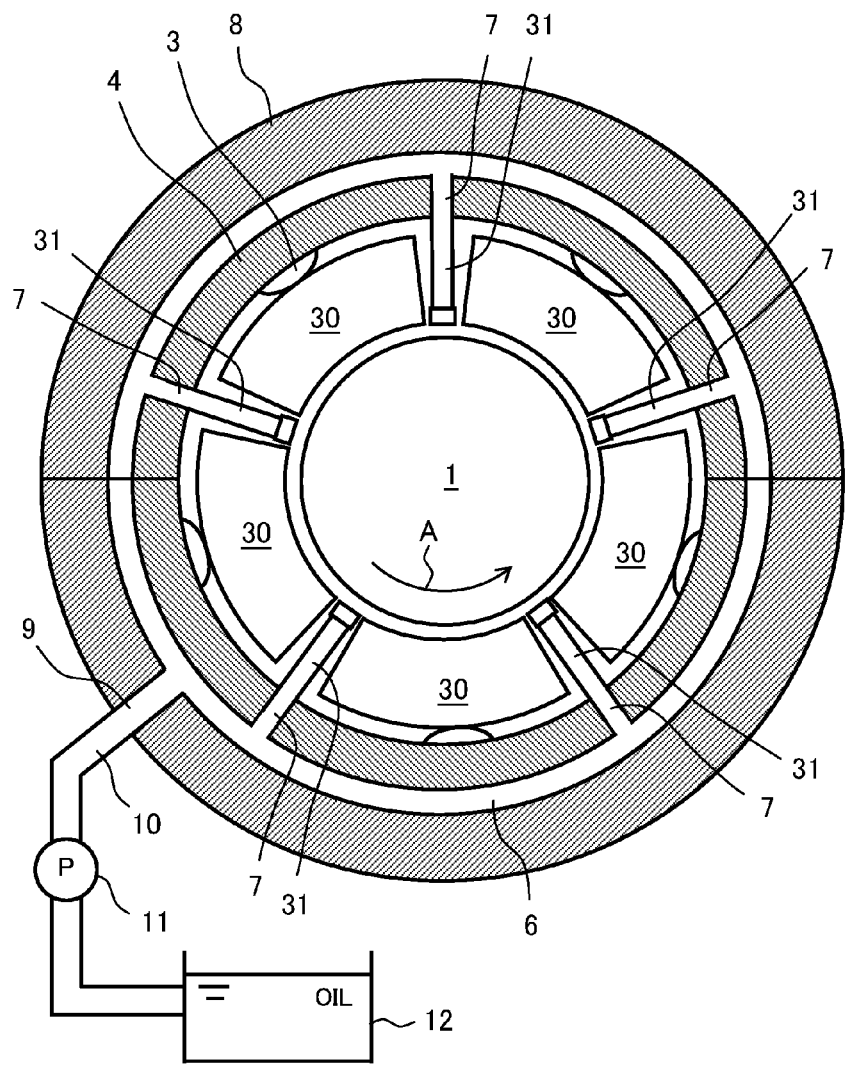
FIG. 5 is a circumferential cross-sectional view showing the structure of a tilting pad type journal bearing as a first comparative example.
Figure 6:
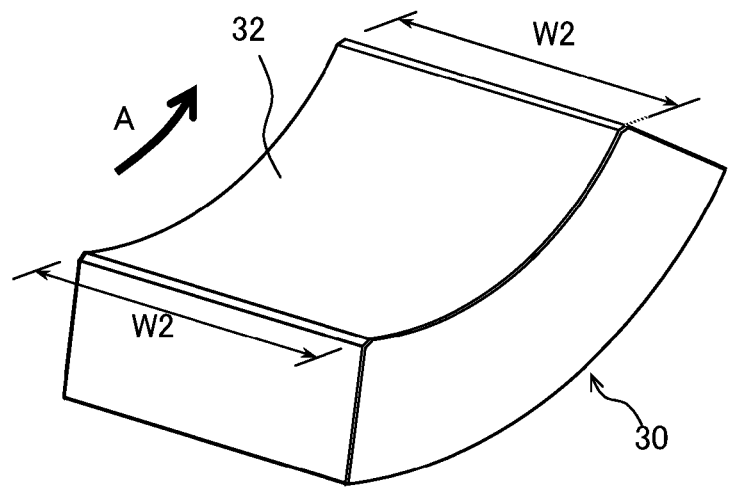
FIG. 6 is a perspective view showing the structure of a pad in the first comparative example.
Figure 7:
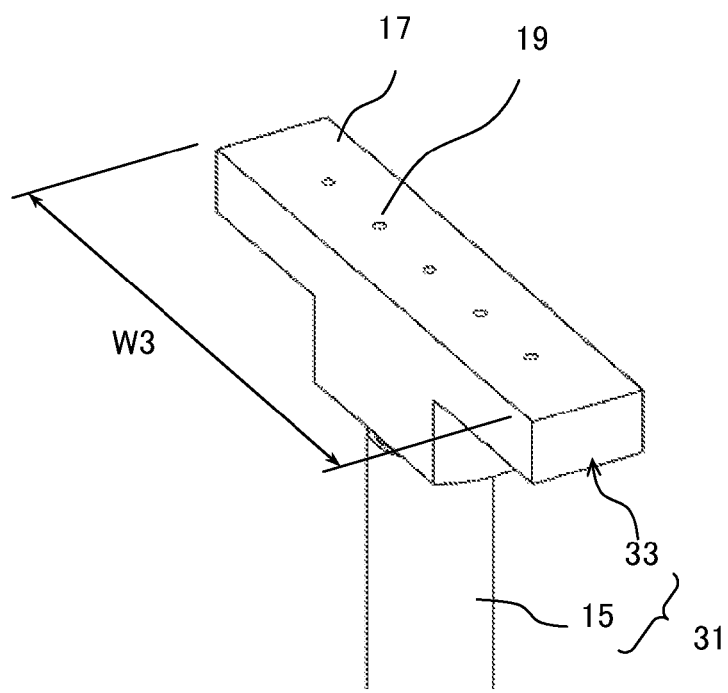
FIG. 7 is a perspective view showing the structure of a nozzle in the first comparative example.
Figure 8:
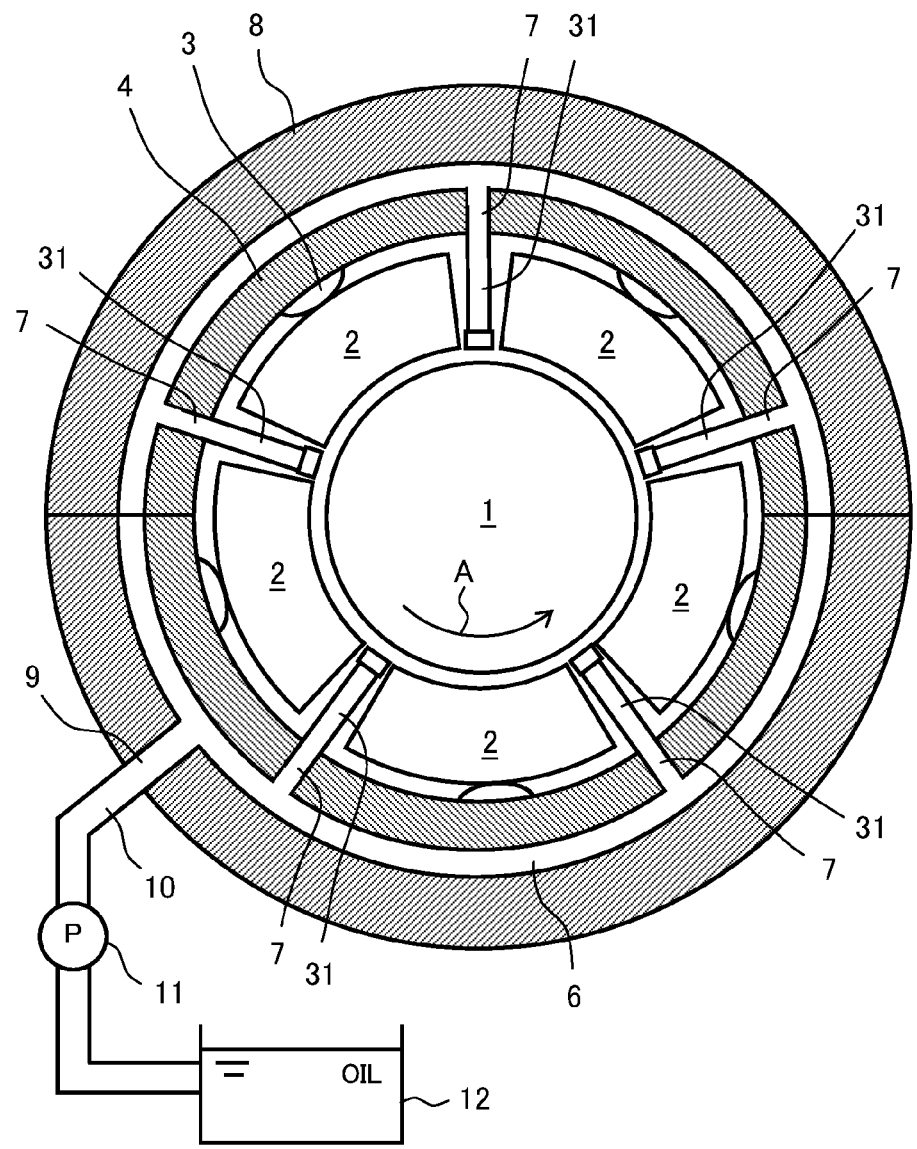
FIG. 8 is a circumferential cross-sectional view showing the structure of a tilting pad type journal bearing as a second comparative example.
Figure 9:
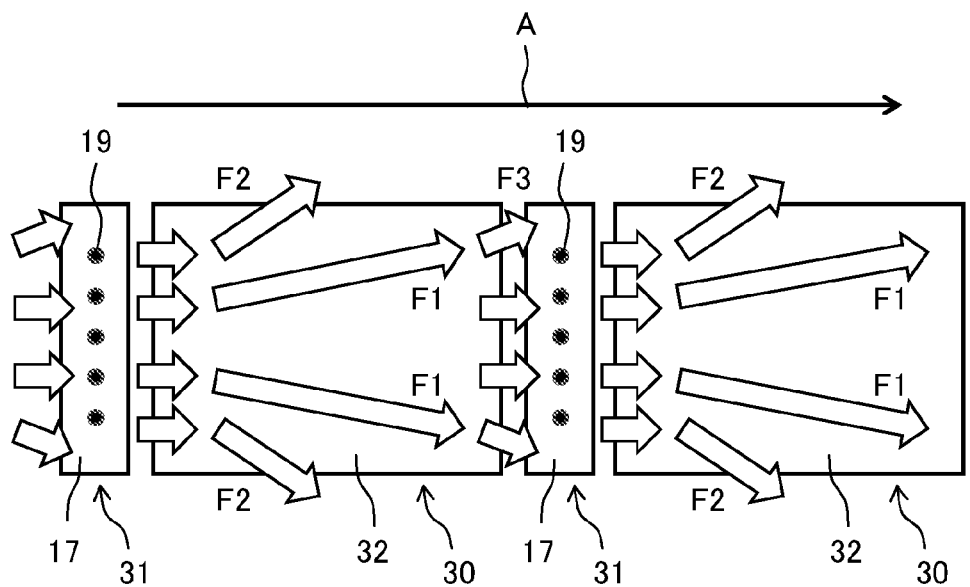
FIG. 9 is a developed view showing the oil flow on the pad sliding surfaces and the nozzle top surfaces in the first comparative example.
Figure 10:
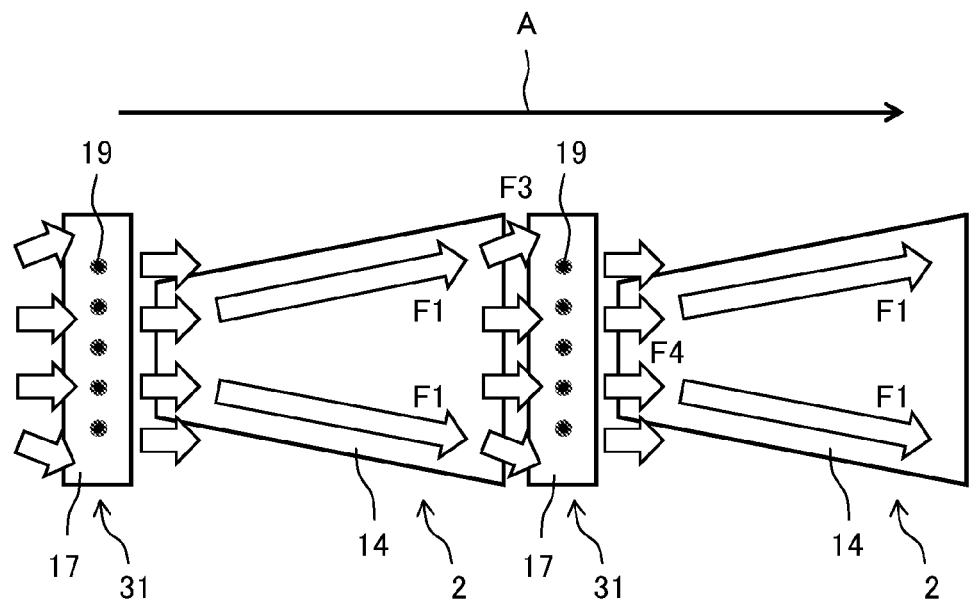
FIG. 10 is a developed view showing the oil flow on the pad sliding surfaces and the nozzle top surfaces in the second comparative example.

FIG. 5 is a circumferential cross-sectional view showing the structure of a tilting pad type journal bearing as a first comparative example. FIG. 6 is a perspective view showing the structure of a pad in the first comparative example. FIG. 7 is a perspective view showing the structure of a nozzle in the first comparative example. FIG. 8 is a circumferential cross-sectional view showing the structure of a tilting pad type journal bearing as a second comparative example. FIG. 9 is a developed view showing the oil flow on the pad sliding surfaces and the nozzle top surfaces in the first comparative example. FIG. 10 is a developed view showing the oil flow on the pad sliding surfaces and the nozzle top surfaces in the second comparative example. FIG. 11 is a developed view showing the oil flow on the pad sliding surfaces and the nozzle top surfaces in this embodiment. Elements in the first and second comparative examples equivalent to those in the first embodiment are assigned the already used reference characters and repeated explanation thereof is omitted properly.

The tilting pad type journal bearing as the first comparative example comprises a plurality of (five in FIG. 5) pads 30 and a plurality of (five in FIG. 5) nozzles 31 which are each arranged between the pads 30. As shown in FIG. 6, a sliding surface 32 of each pad 30 is formed so that its width is constant (W2) from the front edge to the rear edge.

As shown in FIG. 7, the nozzle 31 is formed of a round pipe 15 and a hollow nozzle head 33 which is connected to the tip end of the round pipe 15. No groove part 18 is formed on the top surface 17 of the nozzle head 33. The top surface 17 of the nozzle head 33 is provided with a plurality of oil discharge ports 19. The width dimension of the nozzle head 33 (i.e., the width dimension of the top surface 17 of the nozzle head 33) is W3.

Part of the lubricating oil supplied from the nozzle 31 to a front edge part of the sliding surface 32 of the pad 30 flows towards a rear edge part of the sliding surface 32 as indicated by the arrows F1 in FIG. 9, while the remaining lubricating oil flows towards the side edges of the sliding surface 32 and leaks out as indicated by the arrows F2 in FIG. 9. More specifically, since the oil film thickness decreases as it goes downstream in the circumferential direction as shown in the aforementioned FIGS. 2A and 2B, the cross-sectional area of the oil film also decreases as it goes downstream in the circumferential direction. The oil leaks out via the side edges of the sliding surface 32 of the pad 30 in an amount corresponding to the decrease in the cross-sectional area of the oil film. Thus, the amount of oil leakage via the side edges of the sliding surface 32 of the pad 30 is not small, and the amount of oil supplied from the nozzle 31 has to be set greater in consideration of the amount of oil leakage.

The tilting pad type journal bearing as the second comparative example comprises the pads 2 in the first embodiment instead of the pads 30. As mentioned above, the sliding surface 14 of the pad 2 is formed so that its width increases as it goes downstream in the circumferential direction from the front edge to the rear edge. With this configuration, the cross-sectional area of the oil film does not decrease as it goes downstream in the circumferential direction, or the decrease can be suppressed. Accordingly, the amount of oil leakage via the side edges of the sliding surface 14 of the pad 2 can be reduced. In other words, most of the lubricating oil supplied from the nozzle 31 to the front edge part of the sliding surface 14 of the pad 2 flows towards the rear edge part of the sliding surface 14 as indicated by the arrows F1 in FIG. 10. Therefore, the amount of oil that has to be supplied from the nozzle 31 can be reduced in comparison with the first comparative example.

In the second comparative example, however, in the total amount of lubricating oil flowing out from the rear edge part of the sliding surface 14 of the pad 2 on the upstream side (see arrows F3 in FIG. 10), the ratio of the amount of lubricating oil flowing into the front edge part of the sliding surface 14 of the pad 2 on the downstream side while merging with lubricating oil supplied from the oil discharge ports 19 of the nozzle 31 (see arrows F4 in FIG. 10) decreases. In other words, the amount of the carry-over oil decreases.

The tilting pad type journal bearing according to this embodiment comprises the aforementioned nozzles 5 instead of the nozzles 31. As mentioned above, the groove part 18 is formed on the top surface 17 of the nozzle 5. In the oil flow from the rear edge part of the sliding surface 14 of the upstream pad 2 to the front edge part of the sliding surface 14 of the downstream pad 2, the groove part 18 induces a flow heading from lateral parts towards the center in the width direction (see arrows F5 in FIG. 11). Accordingly, the ratio of the amount of the lubricating oil flowing into the front edge part of the sliding surface 14 of the downstream pad 2 while merging with the lubricating oil supplied from the oil discharge ports 19 of the nozzle 5 (see arrows F6 in FIG. 11) to the amount of the lubricating oil flowing out from the rear edge part of the sliding surface 14 of the upstream pad 2 (see arrows F5 in FIG. 11) can be increased. In other words, the amount of the carry-over oil can be increased. Therefore, the amount of oil that has to be supplied from the nozzle 5 can be reduced.

As described above, according to this embodiment, the amount of oil that has to be supplied to the bearing can be reduced in comparison with the first and second comparative examples.

Figure 12:
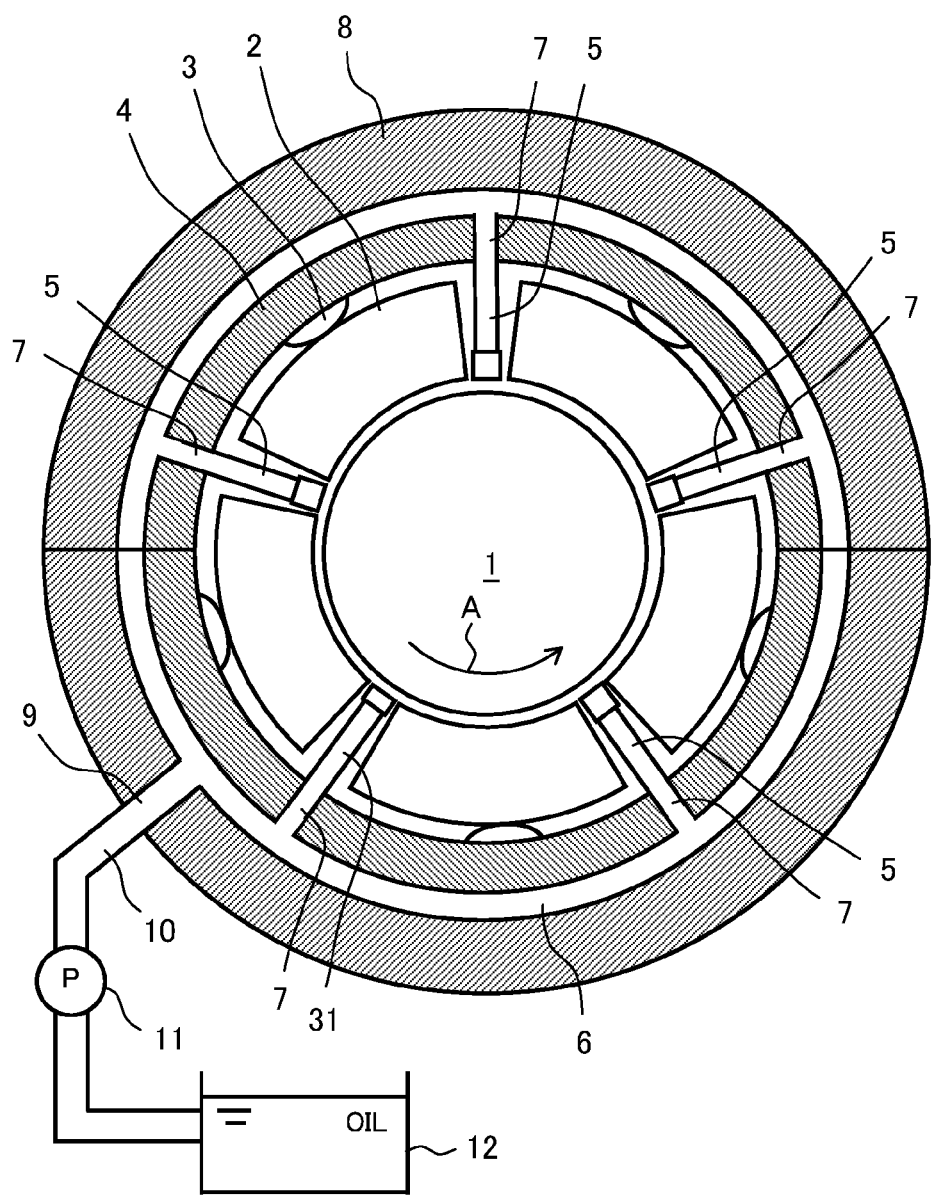
FIG. 12 is a circumferential cross-sectional view showing the structure of a tilting pad type journal bearing according to a second embodiment of the present invention.

A second embodiment of the present invention will be described below with reference to FIG. 12. FIG. 12 is a circumferential cross-sectional view showing the structure of a tilting pad type journal bearing according to the second embodiment of the present invention. Elements in this embodiment equivalent to those in the above embodiment and comparative examples are assigned the already used reference characters and repeated explanation thereof is omitted properly.

The tilting pad type journal bearing in this embodiment is a shaft bearing for supporting the radial-direction load of a rotary shaft 1 extending in a horizontal direction, for example. One of the pads 2 is arranged under (right under) the rotary shaft 1, and thus the load on the particular pad 2 is higher than that on each of the other pads 2. Put another way, the temperature rise of the sliding surface 14 of the particular pad 2 situated under the rotary shaft 1 is greater in comparison with the sliding surfaces 14 of the other pads 2.

Therefore, in this embodiment, the aforementioned nozzle 31 is arranged on the upstream side of the particular pad 2 situated under the rotary shaft 1, by which the amount of the carry-over oil for the particular pad 2 situated under the rotary shaft 1 is reduced and the temperature rise of the sliding surface 14 of the particular pad 2 is suppressed. On the other hand, the aforementioned nozzle 5 is arranged on the upstream side of each of the other pads 2, by which the amount of the carry-over oil for the other pads 2 is increased. Thus, also in this embodiment, the amount of oil that has to be supplied to the bearing can be reduced in comparison with the aforementioned first and second comparative examples.

Figure 13:
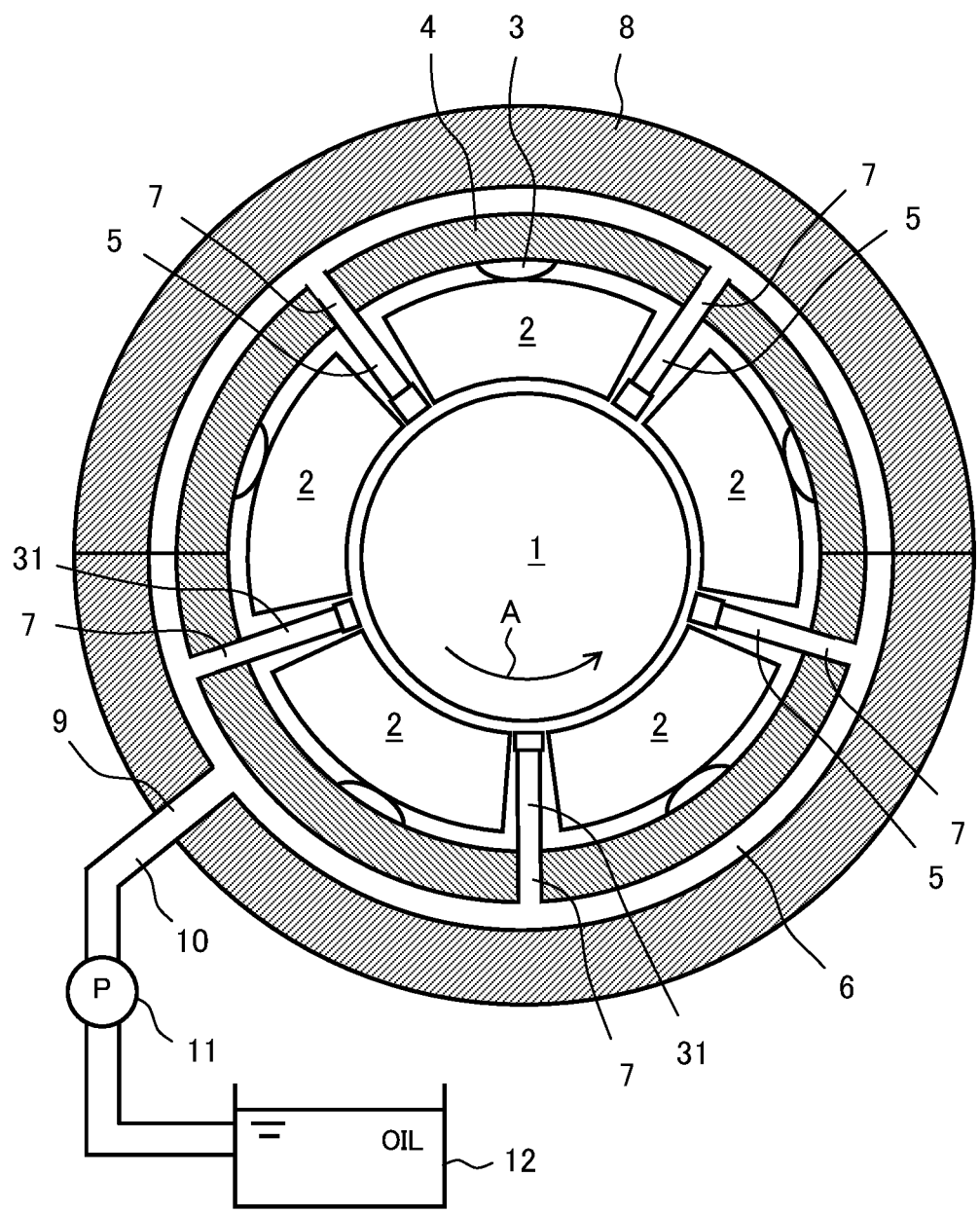
FIG. 13 is a circumferential cross-sectional view showing the structure of a tilting pad type journal bearing according to a third embodiment of the present invention.

A third embodiment of the present invention will be described below with reference to FIG. 13. FIG. 13 is a circumferential cross-sectional view showing the structure of a tilting pad type journal bearing according to the third embodiment of the present invention. Elements in this embodiment equivalent to those in the above embodiments and comparative examples are assigned the already used reference characters and repeated explanation thereof is omitted properly.

The tilting pad type journal bearing in this embodiment is a shaft bearing for supporting the radial-direction load of a rotary shaft 1 extending in a horizontal direction, for example. One of the nozzles is arranged under (right under) the rotary shaft 1, and thus the load on each of two pads 2 situated upstream and downstream of the particular nozzle is higher than that on each of the other pads 2. Put another way, the temperature rise of the sliding surfaces 14 of the two pads 2 upstream and downstream of the particular nozzle situated under the rotary shaft 1 is greater in comparison with the sliding surfaces 14 of the other pads 2.

Therefore, in this embodiment, the aforementioned nozzle 31 is arranged under the rotary shaft 1 and another nozzle 31 is arranged at the position upstream of the former nozzle 31 across one pad 2, by which the amount of the carry-over oil for the two pads 2 upstream and downstream of the particular nozzle 31 situated under the rotary shaft 1 is reduced and the temperature rise of the sliding surfaces 14 of the two pads 2 is suppressed. On the other hand, the aforementioned nozzle 5 is arranged on the upstream side of each of the other pads 2, by which the amount of the carry-over oil for the other pads 2 is increased. Thus, also in this embodiment, the amount of oil that has to be supplied to the bearing can be reduced in comparison with the aforementioned first and second comparative examples.

Although not particularly mentioned in the above second and third embodiments, it is also possible to increase the number and/or the diameter of the oil discharge ports 19 of the nozzle 31 in comparison with the oil discharge ports 19 of the nozzle 5.

While the above description of the embodiments has been given assuming, for example, that the tilting pad type journal bearing comprises four of the nozzles 5 (i.e., the groove parts 18 are formed in the tip end parts of four nozzles) in the second embodiment and three of the nozzles 5 (i.e., the groove parts 18 are formed in the tip end parts of three nozzles) in the third embodiment, the number of the nozzles 5 is not limited to these examples. It is sufficient if the tilting pad type journal bearing comprises at least one nozzle 5 (i.e., the groove part 18 is formed in the tip end part of at least one nozzle).

While the above description of the first through third embodiments has been given by using examples in which the outline width dimension of the top surface 17 of the nozzle 5 (or 31) is greater than the width dimension W2 of the rear edge of the sliding surface 14 of the pad 2, the outline width dimension of the top surface 17 of the nozzle 5 (or 31) may also be set equal to the width dimension W2 of the rear edge of the sliding surface 14 of the pad 2.

While the above description of the first through third embodiments has been given by using examples in which the sliding surface 14 of the pad 2 is formed so that its width in the axial direction increases as it goes downstream in the circumferential direction from the front edge to the rear edge (i.e., the front edge part and the rear edge part are also formed so that its width in the axial direction increases as it goes downstream in the circumferential direction) as shown in FIGS. 3 and 11, the configuration of the sliding surface 14 of the pad 2 is not limited to these examples and can be modified without departing from the subject matter and technical idea of the present invention. For example, the front edge part of the sliding surface of the pad (e.g., front part of the sliding surface within ⅕ circumferential length of the sliding surface from the front edge) may be formed to have a constant width in the axial direction, or the rear edge part of the sliding surface of the pad (e.g., a part from the circumferential-direction position $\theta_B$ where the oil film thickness hits the minimum to the rear edge, or a rear part of the sliding surface within ⅕ circumferential length of the sliding surface from the rear edge) may be formed to have a constant width in the axial direction. Also in these modifications, the amount of oil leakage via the side edges of the sliding surface of the pad can be decreased and the amount of oil that has to be supplied to the bearing can be reduced.

Figure 14:
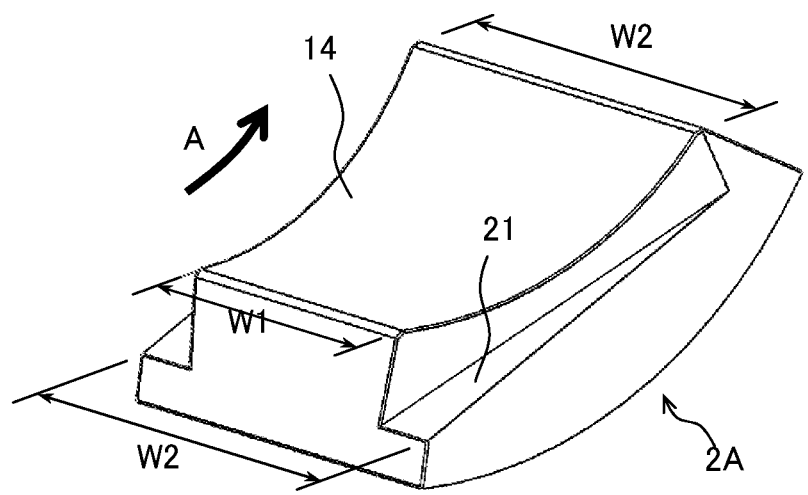
FIG. 14 is a perspective view showing the structure of a pad in a modification according to the present invention.

While the above description of the first through third embodiments has been given by using examples in which the pad 2 is formed so that its total width in the axial direction increases as it goes downstream in the circumferential direction from the front edge (upstream end in the circumferential direction) to the rear edge (downstream end in the circumferential direction), the configuration of the pad 2 is not limited to these examples and can be modified without departing from the subject matter and technical idea of the present invention. For example, as shown in FIG. 14, a pad 2A may be configured to have a step surface 21 (specifically, a step surface 21 more recessed than the sliding surface 14 and forming no oil film between itself and the peripheral surface 13 of the rotary shaft 1) on each side of the sliding surface 14 in the axial direction. The pad 2A may also be configured so that its total width (including the sliding surface 14 and the step surfaces 21) in the axial direction is constant (W2) from the front edge (upstream end in the circumferential direction) to the rear edge (downstream end in the circumferential direction). Also in such a modification, the amount of oil that has to be supplied to the bearing can be reduced similarly to the above embodiments. Further, in this modification, the gap between each side face of the pad 2A and a wall surface facing the side face becomes narrower than those in the above embodiments. Therefore, mobility of the pad 2A in the axial direction decreases and mountability of the pad 2A is improved.

What is claimed is:

1. A tilting pad type journal bearing comprising:
   a plurality of pads which are arranged along the periphery of a rotary shaft;
   a bearing housing which supports the pads in a tiltable manner via a plurality of pivots; and
   a plurality of nozzles which are each disposed between the pads to supply lubricating oil to sliding surfaces of the pads, wherein
   the sliding surface of each of the pads is formed so that a width of the sliding surface increases from a front edge part towards a rear edge part of the sliding surface, and
   a tip end part of at least one of the nozzles includes a groove part having a trapezoidal shape when viewed in the normal direction with respect to a top surface of the tip end part, which induces a flow heading from lateral parts towards a center in the width direction, in an oil flow from the rear edge part of the sliding surface of an upstream pad to the front edge part of the sliding surface of a downstream pad.

2. The tilting pad type journal bearing according to claim 1, wherein:
the tip end part of the at least one of the nozzles has a top surface having an outline width dimension greater than or equal to the width dimension of the rear edge part of the sliding surface of the pad, and
the groove part is formed on the top surface of the at least one of the nozzles.

3. The tilting pad type journal bearing according to claim 2, wherein:
each nozzle not having the groove part includes at least one oil discharge port formed on the top surface, and
the at least one of the nozzles having the tip part that has the groove part includes at least one oil discharge port formed at the bottom of the groove part.

4. The tilting pad type journal bearing according to claim 2, wherein:
the rotary shaft extends in a horizontal direction, and
the groove part is formed on at least one of the nozzles excluding a nozzle on the upstream side of a pad situated under the rotary shaft.

5. The tilting pad type journal bearing according to claim 2, wherein:
the rotary shaft extends in a horizontal direction, and
the groove part is formed on at least one of the nozzles excluding a nozzle situated under the rotary shaft and a nozzle situated upstream of the former nozzle across a pad.

6. The tilting pad type journal bearing according to claim 1,
wherein at least one of the plurality of the pads is configured to have step surfaces disposed on both sides of the sliding surface in the axial direction that are recessed with respect to the sliding surface so that a total width of the entire pad including the sliding surface and the step surfaces is constant from its front edge to its rear edge.

* * * * *